US012309827B2

(12) United States Patent
Hosseini et al.

(10) Patent No.: US 12,309,827 B2
(45) Date of Patent: May 20, 2025

(54) COLLISION HANDLING

(71) Applicant: QUALCOMM Incorporated, San Diego, CA (US)

(72) Inventors: Seyedkianoush Hosseini, San Diego, CA (US); Wei Yang, San Diego, CA (US); Amir Aminzadeh Gohari, Sunnyvale, CA (US); Peter Gaal, San Diego, CA (US); Wanshi Chen, San Diego, CA (US); Yi Huang, San Diego, CA (US); Xiao Feng Wang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/500,769

(22) Filed: Oct. 13, 2021

(65) Prior Publication Data

US 2022/0070885 A1 Mar. 3, 2022

Related U.S. Application Data

(63) Continuation of application No. 16/739,970, filed on Jan. 10, 2020, now Pat. No. 11,172,495.

(Continued)

(51) Int. Cl.
*H04W 72/566* (2023.01)
*H04W 72/1268* (2023.01)
(Continued)

(52) U.S. Cl.
CPC ..... *H04W 72/569* (2023.01); *H04W 72/1268* (2013.01); *H04W 72/21* (2023.01); *H04W 72/23* (2023.01)

(58) Field of Classification Search
CPC ... H04W 72/21; H04W 72/23; H04W 72/569; H04W 72/566; H04W 28/0205;
(Continued)

(56) References Cited

U.S. PATENT DOCUMENTS 9,520,984 B2 * 12/2016 Yang ........................ H04L 5/14
9,949,275 B2    4/2018 Chen et al.
(Continued)

FOREIGN PATENT DOCUMENTS

CN    102577209 A    7/2012
CN    103168441 A    6/2013
(Continued)

OTHER PUBLICATIONS

CATT: "Discussion on NR HARQ-ACK Feedback Mechanisms", 3GPP Draft, 3GPP TSG RAN WG1 Meeting #88bis, R1-1704583, 3rd Generation Partnership Project (3GPP), Mobile Competence Centre, 650, Route Des Lucioles, F-06921 Sophia-Antipolis Cedex, France, vol. RAN WG1. No. Spokane, USA, Apr. 3, 2017-Apr. 7, 2017, Apr. 2, 2017 (Apr. 2, 2017), XP051242722, 4 Pages, Retrieved from the Internet: URL: http://www.3gpp.org/ftp/Meetings_3GPP_SYNC/RAN1/Docs/, [retrieved on Apr. 2, 2017], p. 1, Para 2, p. 3, Para 3, p. 4, Para 4.

(Continued)

*Primary Examiner* — David Q Nguyen
(74) *Attorney, Agent, or Firm* — QUALCOMM INCORPORATED

(57) ABSTRACT

In an aspect, a UE determines whether there is an overlap between a first uplink transmission channel allocated for transmission of a first uplink transmission and a second uplink transmission channel allocated for transmission of second uplink transmission. The UE generates a combined uplink transmission payload in response to a determination that there is the overlap, wherein the combined uplink (Continued)

transmission payload includes at least a portion of the first uplink transmission and at least a portion of the second uplink transmission. The UE transmits the combined uplink transmission payload on either the first uplink transmission channel or the second uplink transmission channel. A base station receives the combined uplink transmission payload transmitted by the UE.

28 Claims, 9 Drawing Sheets

Related U.S. Application Data

(60) Provisional application No. 62/791,600, filed on Jan. 11, 2019.

(51) Int. Cl.
*H04W 72/21* (2023.01)
*H04W 72/23* (2023.01)

(58) Field of Classification Search
CPC . H04W 72/1268; H04W 72/02; H04W 72/56; H04W 72/0446; H04L 47/41; H04L 1/1861; H04L 5/0055; H04L 1/1812; H04L 1/1896
USPC .................................. 370/328, 329, 330, 331
See application file for complete search history.

(56) References Cited

U.S. PATENT DOCUMENTS

| | | | |
|---|---|---|---|
| 11,432,369 B2* | 8/2022 | Xiong | H04L 5/0091 |
| 11,470,626 B2* | 10/2022 | Takeda | H04L 27/26 |
| 11,876,747 B2* | 1/2024 | Lee | H04L 1/1864 |
| 2011/0243066 A1 | 10/2011 | Nayeb Nazar et al. | |
| 2016/0094996 A1 | 3/2016 | Xiong et al. | |
| 2017/0238306 A1 | 8/2017 | Patel et al. | |
| 2017/0311343 A1 | 10/2017 | Chendamarai Kannan et al. | |
| 2018/0279291 A1 | 9/2018 | Tiirola et al. | |
| 2019/0230648 A1* | 7/2019 | Kim | H04W 72/21 |
| 2019/0239216 A1* | 8/2019 | Kundu | H04W 72/21 |
| 2019/0261361 A1* | 8/2019 | Xiong | H04W 72/02 |
| 2019/0327757 A1 | 10/2019 | Oteri et al. | |
| 2019/0357219 A1 | 11/2019 | Wong et al. | |
| 2019/0380124 A1* | 12/2019 | Kim | H04W 72/21 |
| 2020/0029335 A1* | 1/2020 | Yang | H04W 52/54 |
| 2020/0228248 A1* | 7/2020 | Islam | H04L 1/1861 |
| 2020/0229211 A1 | 7/2020 | Hosseini | |
| 2020/0281011 A1* | 9/2020 | Xiong | H04W 72/20 |
| 2020/0359403 A1* | 11/2020 | Lee | H04W 72/21 |
| 2020/0404666 A1 | 12/2020 | Gao et al. | |
| 2021/0014026 A1* | 1/2021 | Papasakellariou | H04L 1/1861 |
| 2021/0084644 A1 | 3/2021 | Bae et al. | |
| 2021/0160901 A1* | 5/2021 | Takeda | H04W 72/21 |
| 2021/0297221 A1* | 9/2021 | Lee | H04L 5/0053 |
| 2021/0314105 A1* | 10/2021 | Gao | H04L 1/1812 |
| 2021/0314918 A1* | 10/2021 | Gao | H04W 72/54 |
| 2022/0006570 A1* | 1/2022 | Lee | H04W 72/543 |
| 2022/0078768 A1* | 3/2022 | El Hamss | H04L 5/0055 |

FOREIGN PATENT DOCUMENTS

| | | | | |
|---|---|---|---|---|
| CN | 106664520 A | | 5/2017 | |
| EP | 3454608 B1 * | | 11/2020 | ........... H04L 5/0048 |
| WO | 2015050743 | | 4/2015 | |
| WO | 2017143004 | | 8/2017 | |
| WO | 2017184932 | | 10/2017 | |
| WO | 2019024713 A1 | | 2/2019 | |

OTHER PUBLICATIONS

Intel Corporation: "Remaining Details on NR PUCCH", 3GPP Draft, 3GPP TSG RAN WG1 Meeting #94bis, R1-1810755 Intel PUCCH, 3rd Generation Partnership Project (3GPP), Mobile Competence Centre, 650, Route Des Lucioles, F-06921 Sophia-Antipolis Cedex, FR,vol. RAN WG1. No. Chengdu, CN, Oct. 8, 2018-Oct. 12, 2018, Sep. 29, 2018 (Sep. 29, 2018), XP051518159,7 Pages,Retrieved from Internet:URL:http://www.3gpp.org/ftp/tsg%5Fran/WG1%5FRL1/TSGR1%5F94b/Docs/R1%2D1810755%2Ezip[retrieved Sep. 29, 2018]p. 2, para 2.1, p. 3, para 2.2, p. 5, para 2.4.

International Search Report and Written Opinion—PCT/US2020/013244—ISA/EPO—Mar. 30, 2020.

Nokia, et al., "Beam Selection and Consolidation Enhancements", 3GPP Draft, 3GPP TSG-RAN WG2 Meeting #103, R2-1812317 Beam Selection and Consolidation Enhancements, 3rd Generation Partnership Project (3GPP), Mobile Competence Centre, 650, Route Des Lucioles, F-06921 Sophia-Antipolis Cedex, F, vol. RAN WG2, No. Gothenburg, Sweden,Aug. 20, 2018-Aug. 24, 2018, Aug. 10, 2018(Aug. 10, 2018), XP051521924, 10 Pages, Retrieved from Internet: URL:http://www.3gpp.org/ftp/tsg%5Fran/WG2%5FRL2/TSGR2%5F103/Docs/R2%2D1812317%2Ezip,[retrieved Aug. 10, 2018].

Taiwan Search Report—TW109101047—TIPO—May 10, 2023.

\* cited by examiner

COLLISION HANDLING

CROSS-REFERENCE TO RELATED APPLICATION

The present Application for Patent is a Continuation of Non-Provisional patent application Ser. No. 16/739,970 entitled "COLLISION HANDLING," filed Jan. 10, 2020, which in turn claims the benefit of Provisional Patent Application No. 62/791,600 entitled "COLLISION HANDLING," filed Jan. 11, 2019, each of which is assigned to the assignee hereof, and each of which is hereby expressly incorporated herein by reference in its entirety.

INTRODUCTION

Aspects of this disclosure relate generally to telecommunications, and more particularly to collision handling.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some applications, for example, autonomous driving systems, telesurgical applications, etc., cannot function safely and/or effectively if latency arises. Accordingly, 5G systems may incorporate standards for Ultra Reliable Low Latency Communications (URLLC), attempting to ensure that latencies are reduced to a duration of one millisecond or less. In other applications, for example, mobile devices, 5G systems may incorporate standards for enhanced Mobile Broad Band (eMBB), which enables high data rates. For 5G systems that handle multiple use cases (URLLC, eMBB, etc.), collision handling has emerged as a critical issue. For example, one uplink transmission may collide with another uplink transmission. New techniques are necessary for efficient and effective uplink transmission in systems with multiple use cases.

SUMMARY

The following summary is an overview provided solely to aid in the description of various aspects of the disclosure and is provided solely for illustration of the aspects and not limitation thereof.

Methods and apparatuses for collision handling are disclosed.

An aspect is directed to a method of operating a user equipment (UE), comprising determining whether there is an overlap between a first uplink transmission channel allocated for transmission of a first uplink transmission and a second uplink transmission channel allocated for transmission of a second uplink transmission, generating a combined uplink transmission payload in response to a determination that there is the overlap, wherein the combined uplink transmission payload includes at least a portion of the first uplink transmission and at least a portion of the second uplink transmission, and transmitting the combined uplink transmission payload on either the first uplink transmission channel or the second uplink transmission channel.

Another aspect is directed to a method of operating a base station, comprising receiving, on either a first uplink transmission channel or a second uplink transmission channel, a combined uplink transmission payload that includes at least a portion of a first uplink transmission associated with transmission over the first uplink transmission channel and a second uplink transmission associated with transmission over the second uplink transmission channel.

Another aspect is directed to a user equipment (UE), comprising a memory, and at least one processor coupled to the memory and configured to determine whether there is an overlap between a first uplink transmission channel allocated for transmission of a first uplink transmission and a second uplink transmission channel allocated for transmission of second uplink transmission generate a combined uplink transmission payload in response to a determination that there is the overlap, wherein the combined uplink transmission payload includes at least a portion of the first uplink transmission and at least a portion of the second uplink transmission, and transmit the combined uplink transmission payload on either the first uplink transmission channel or the second uplink transmission channel.

Another aspect is directed to a base station, comprising a memory, and at least one processor coupled to the memory and configured to receive, on either a first uplink transmission channel or a second uplink transmission channel, a combined uplink transmission payload that includes at least a portion of first uplink transmission associated with transmission over the first uplink transmission channel and second uplink transmission associated with transmission over the second uplink transmission channel.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
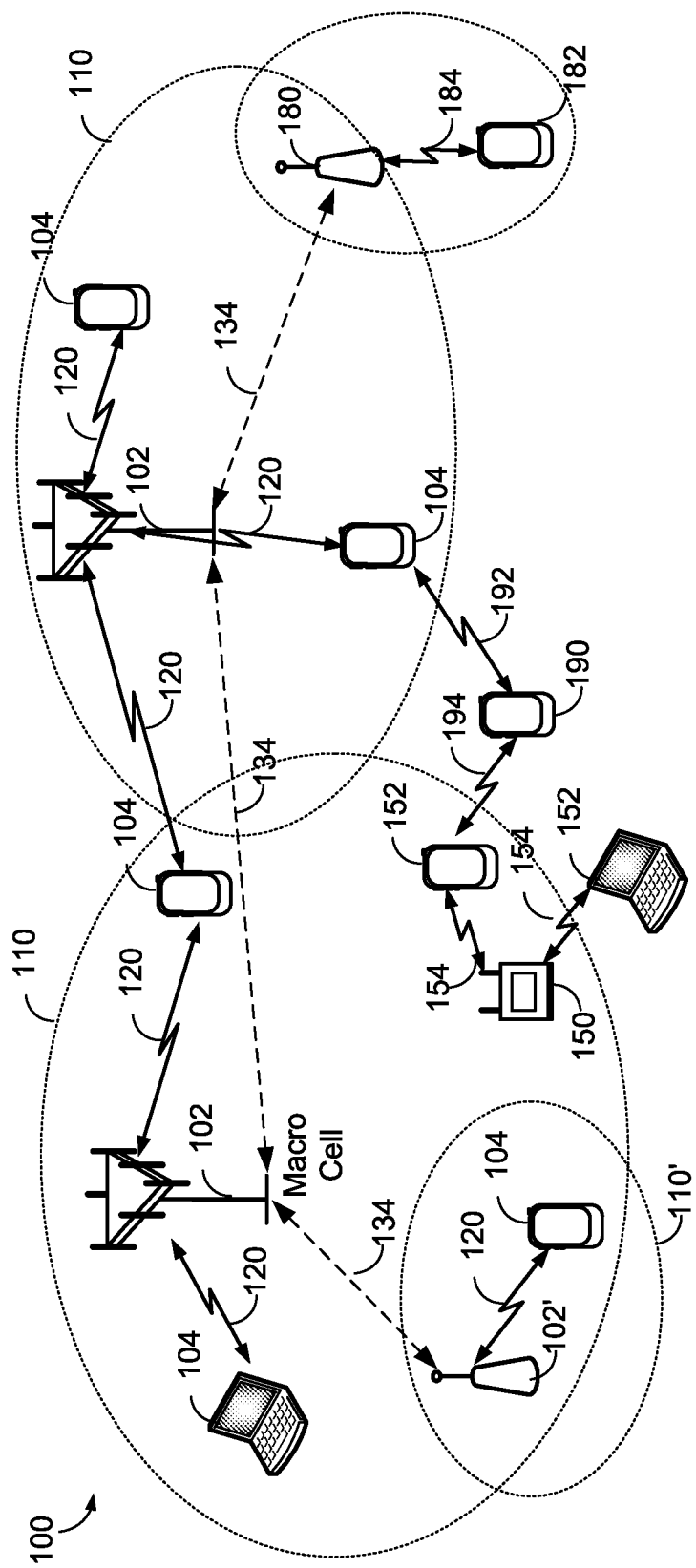
FIG. 1 generally illustrates a wireless environment in accordance with aspects of the disclosure.

Various aspects described herein generally relate to wireless communication systems, and more particularly, to identifying beams of interest for position estimation. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, the small cell 102' may have a coverage area 110' that substantially overlaps with the coverage area 110 of one or more macro base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE or 5G technology and use the same 5 GHz unlicensed frequency spectrum as used by the WLAN AP 150. The small cell 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with UE 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
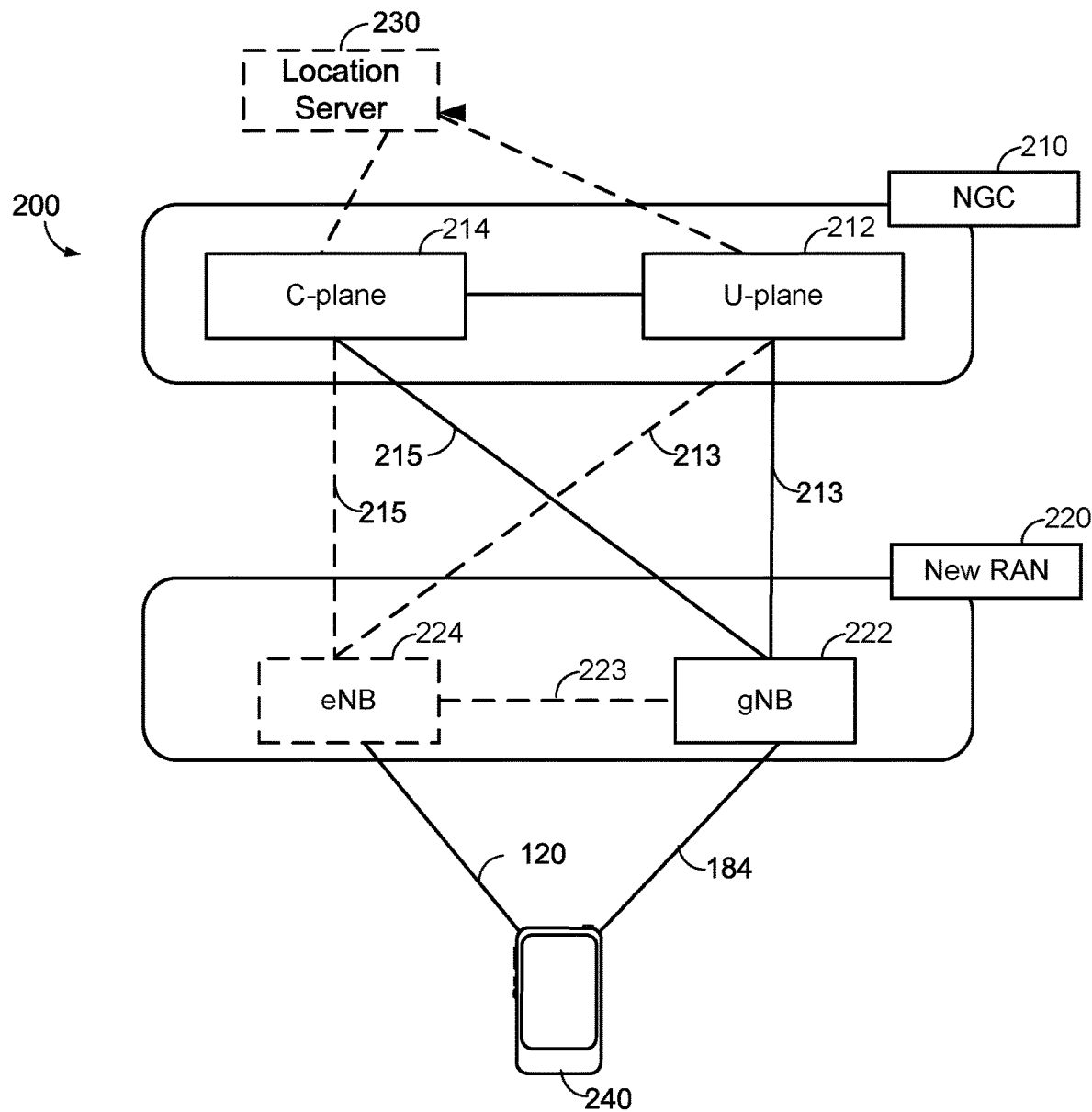
FIG. 2A generally illustrates an example wireless network structure.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
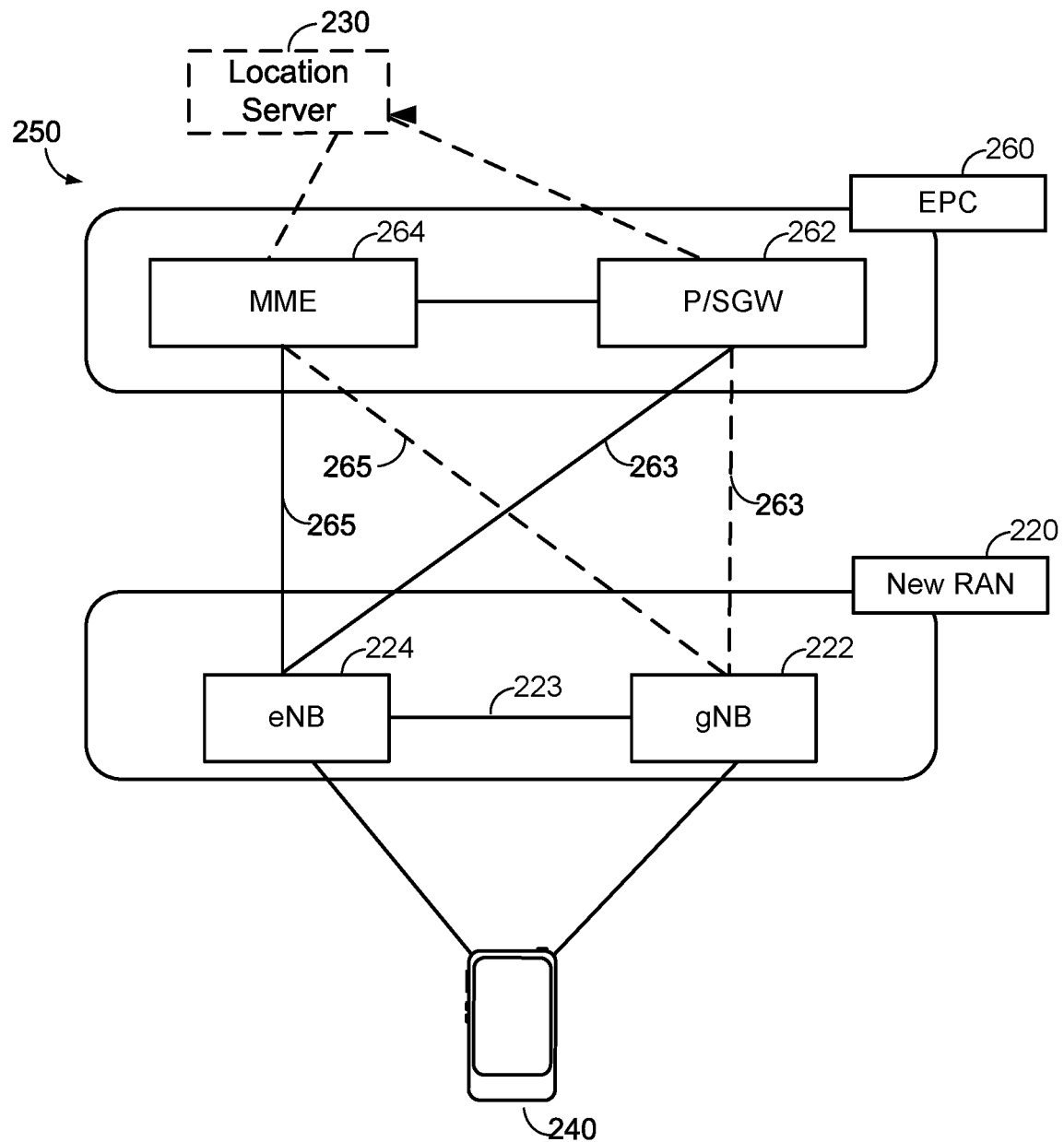
FIG. 2B generally illustrates another example wireless network structure.

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW), 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
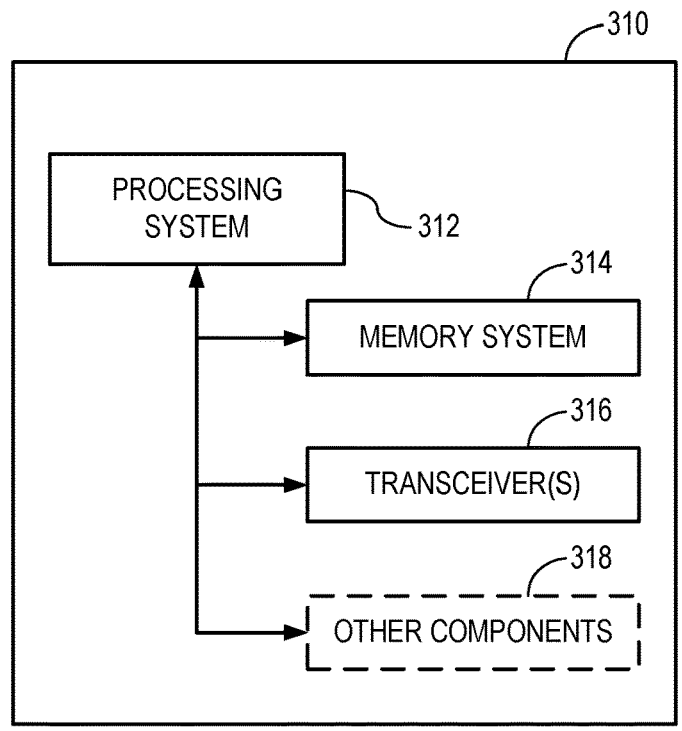
FIG. 3A generally illustrates a UE in accordance with aspects of the disclosure.

FIG. 3A generally illustrates a UE 310 in accordance with aspects of the disclosure. The UE 310 may be analogous to the depicted in FIG. 1. The UE 310 depicted in FIG. 3A includes a processing system 312, a memory system 314, and at least one transceiver 316. The UE 310 may optionally include other components 318.

The processing system 312 may include one or more microprocessors, microcontrollers, and/or digital signal processors that provide processing functions, as well as other calculation and control functionality. The memory system 314 may be configured to store data and/or instructions for executing programmed functionality within the UE 310. The memory system 314 may include on-board memory that is, for example, in a same integrated circuit package as the processing system 312. Additionally or alternatively, the memory system 314 may include memory that is external to the processing system 312 and functionally coupled over a common bus.

The at least one transceiver 316 may be configured to receive one or more downlink signals transmitted from a base station during a downlink period associated with a TDD wireless architecture. The at least one at least one transceiver 316 may be further configured to transmit one or more uplink signals to the base station BS during an uplink period associated with the TDD wireless architecture. The downlink signals may be modulated using a downlink carrier wave, and the uplink signals may be modulated using an uplink carrier wave.

In some implementations, the at least one transceiver 316 may comprise one or more antennas, one or more modulators, one or more demodulators, one or more filters, a transceiver clock, and/or any other suitable hardware. The at least one transceiver 316 may further comprise any suitable hardware and/or software for receiving, processing, and/or storing the received positioning signals. In some implementations, the at least one transceiver 316 may comprise a transceiver processor and/or a transceiver memory that are analogous in some respects to the processing system 312 and the memory system 314 described above. For example, certain tasks that would otherwise be performed by the processing system 312 and the memory system 314 may be offloaded to the transceiver processing system and/or the transceiver memory system associated with the at least one transceiver 316. It will be understood that any reference to a processing system or a memory system herein may refer to the processing system 312 and the memory system 314, the transceiver processing system and the transceiver memory system, or any combination thereof.

It will be understood that the UE 310 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in an automotive vehicle, and/or any other device with a need for position sensing capability. As such, the UE 310 may include any number of other components 318.

Figure 3B:
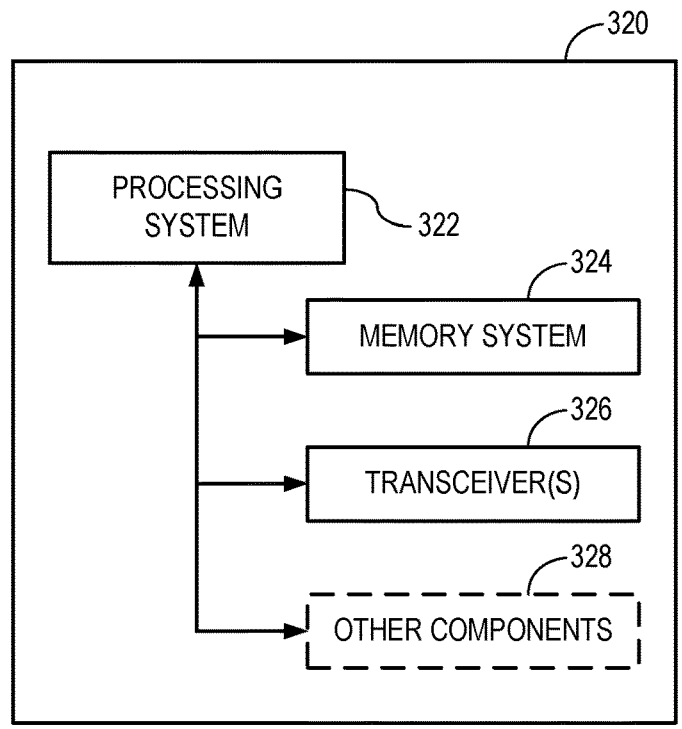
FIG. 3B generally illustrates a base station in accordance with aspects of the disclosure.

FIG. 3B generally illustrates a base station 320 in accordance with aspects of the disclosure. The base station 320 may be analogous to one or more of the depicted in FIG. 1. In some implementations, the base station 320 may be a next-generation NodeB (abbreviated as gNB) that operates in accordance with a 5G wireless architecture.

The base station 320 depicted in FIG. 3 includes a processing system 322, a memory system 324, and at least one transceiver 326. Each of the processing system 322, the memory system 324, and the at least one transceiver 326 may be analogous in some respects to the processing system 312, the memory system 314, and the at least one transceiver 316 depicted in FIG. 3A, respectively. The base station 320 may optionally include other components 328.

The at least one transceiver 326 may be configured to receive one or more uplink signals transmitted from, for example, the UE 310 depicted in FIG. 3A. The at least one transceiver 326 may be further configured to receive one or more downlink signals from the UE 310 during an uplink period associated with a TDD wireless architecture. The downlink signals may be modulated using a downlink carrier wave, and the uplink signals may be modulated using an uplink carrier wave.

Figure 3C:
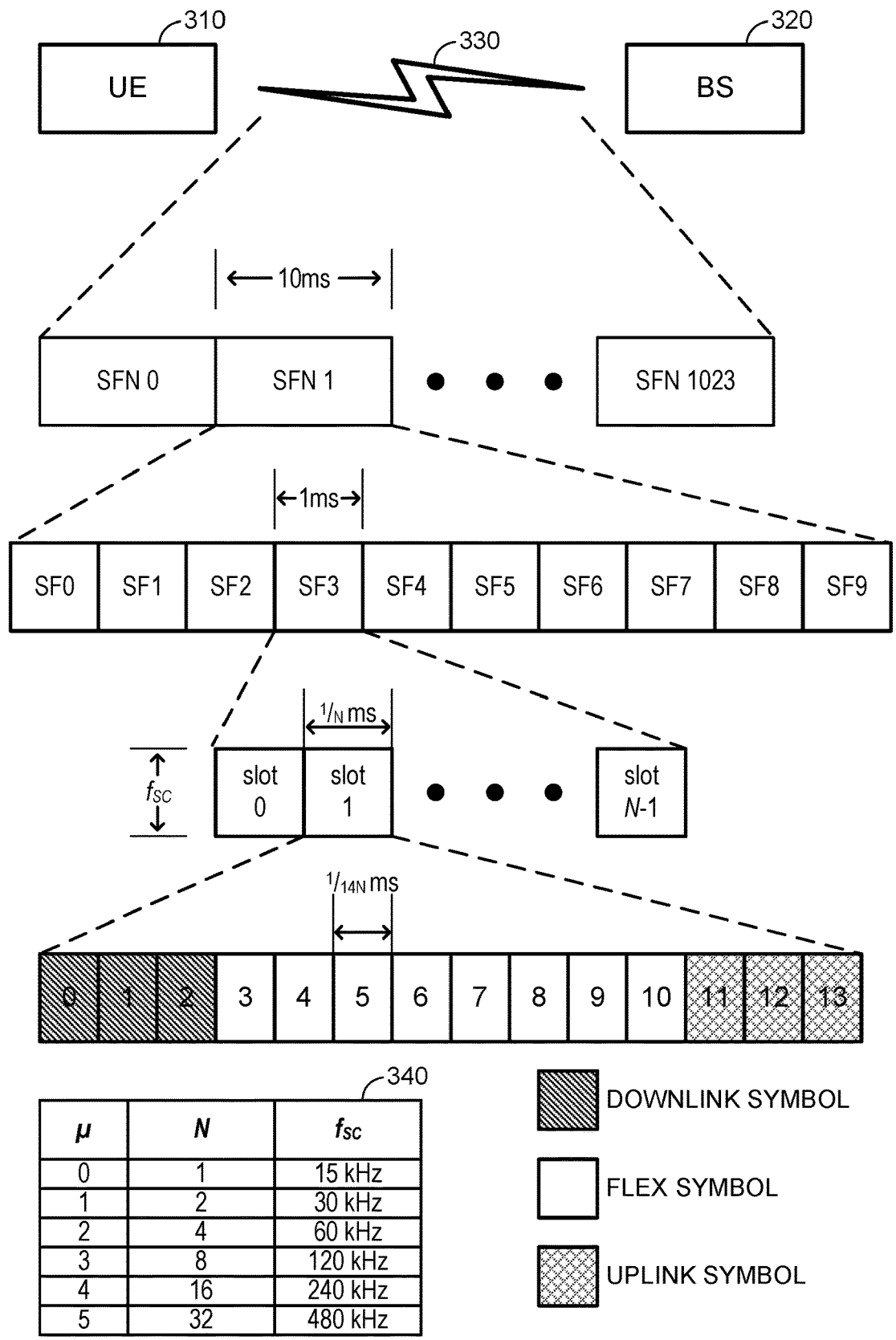
FIG. 3C generally illustrates a TDD frame structure that the UE and the base station depicted in FIGS. 3A-3B may utilize for wireless communication in accordance with aspects of the disclosure.

FIG. 3C generally illustrates a TDD frame structure 330 that the UE 310 and the base station 320 depicted in FIGS. 3A-3B may utilize for wireless communication in accordance with aspects of the disclosure. The TDD frame structure 330 may be, for example, a 5G TDD frame structure.

The TDD frame structure 330 may comprise a series of radio frames that are indexed in accordance with a System Frame Number (SFN) numerology (SFN N, N+1, N+2, etc.). In the example of FIG. 3C, the TDD frame structure 330 is constituted by one thousand and twenty-four radio frames, each radio frame having a duration of ten milliseconds. Each radio frame may be divided into subframes (SFs), which may also be indexed (e.g., SF0, SF1, etc.). In the example of FIG. 3C, each radio frame in the TDD frame structure 330 is constituted by ten subframes, each subframe having a duration of one millisecond.

Each respective subframe may be further divided into slots. Unlike previous architectures, which specify a fixed number of slots per subframe (for example, two), 5G may have multiple configurations $\mu$, wherein each configuration $\mu$ may be associated with a particular number N of slots per subframe. FIG. 3C depicts a configuration chart 340 showing various configurations ($\mu=0$, $\mu=1$, $\mu=2$, etc.) and the specified number of slots per subframe associated with each configuration (N=1, N=2, N=4, etc.). As will be further understood from FIG. 3C, the configuration chart 340 may also specify for each configuration $\mu$ a particular subcarrier spacing $f_{SC}$. For example, configuration $\mu=2$ may correspond to N=4 and $f_{SC}=60$ kHz. Although FIG. 3C depicts a subframe that includes four or more slots (numbered 0, 1 . . . N−1), it will be understood that in certain configurations (for example, $\mu=0$ and $\mu=1$) there may be fewer than four slots (for example, one or two).

Different configurations $\mu$ may be suitable for different environments. For example, macrocell coverage may use frequencies below 3 GHz. Accordingly, the narrower subcarrier spacing associated with $\mu=0$, $\mu=1$, or $\mu=2$ may be optimal for macrocell coverage. By contrast, $\mu=3$ may be more suitable for small cell coverage implemented on frequencies at or above 3 GHz, µ=4 may be suitable for indoor wideband coverage near frequencies around 5 GHz, and µ=5 may be suitable for millimeter wave (mmW) coverage at, for example, 28 GHz.

Each slot may be further divided into symbol periods. In the example of FIG. 3C, there are fourteen symbols per slot, regardless of the configuration µ being used. Each symbol may be reserved for uplink, reserved for downlink, or reserved for flexible scheduling (i.e., selectable for scheduling as uplink or downlink, as required). FIG. 3C depicts a particular slot configuration in which the first three symbols are reserved for downlink, the last three symbols are reserved for uplink, and the eight symbols in between are reserved for flexible scheduling. However, it will be understood that there are many possible slot configurations.

The slot configuration depicted in FIG. 3C includes a downlink period of between three and eleven symbol periods and an uplink gap consisting of between three and eleven symbol periods. For example, if all eight of the flex symbol periods are reserved for uplink, the downlink period may consist of three symbol periods and the uplink gap may consist of eleven symbol periods. By contrast, the uplink gap may be as small as three symbol periods.

Previous handling of uplink collisions has included multiplexing rules that attempt to resolve the collision between different uplink channels. For example, a Physical Uplink Shared Channel (PUSCH) may collide with a Physical Uplink Control Channel (PUCCH), or two PUCCH may collide with one another. The PUCCH may be used to transmit Hybrid Automatic Repeat Request acknowledgements (HARQ-ACK), Scheduling Requests (SR), or Channel State Information (CSI). Any of these transmission types (HARQ-ACK, SR, and/or CSI) may collide with one or more of the remaining transmission types.

3GPP Technical Specification 38.213, Section 9 specifies that when collisions of these kinds occur, multiple Uplink Control Information (UCI) signals may be multiplexed on PUSCH and/or PUCCH. Multiplexing may occur if a joint timeline across the overlapping channels is satisfied. The joint timelines may be provided in the Specification. In particular, when one of the colliding channels is PUSCH, the UCI may be multiplexed on PUSCH. For example, if PUSCH collides with a PUCCH carrying UCI, the transmission may be multiplexed such that the transmitted PUSCH carries the UCI. As another example, if a PUSCH carrying Aperiodic CSI (A-CSI) or Semi-Persistent CSI (SP-CSI) collides with a PUCCH carrying HARQ-ACK, then the ACK or NAK may be transmitted using the PUSCH. As another example, if multiple dynamic PUSCH collide with a Grant-Free PUSCH (GF-PUSCH) carrying UCI, then the UCI may be sent on one of the dynamic PUSCH. As another example, if PUSCH on different serving cells collide with PUCCH carrying UCI, then the UCI may be piggy-backed on the earliest PUSCH on the serving cell with the smallest index. As another example, if a repetition-based PUSCH collides with a PUCCH carrying HARQ-ACK, then the HARQ-ACK may be sent on the PUSCH that collides with the PUCCH.

Moreover, when multiple PUCCH collide, other collision handling may be specified. For example, if a HARQ-ACK with up to two bits collides with an SR, then the HARQ-ACK may be sent using its own resources or using SR resources. As another example, if a PUCCH with format 2, format 3, or format 4 carrying a HARQ-ACK collides with an SR, then n bits may be appended to the HARQ-ACK PUCCH. As another example, if a PUCCH with format 2, format 3, or format 4 carrying CSI collides with an SR, then n bits may be appended to the CSI PUCCH. As another example, if a PUCCH carrying HARQ-ACK collides with CSI, then multiplexing is configurable. As another example, if a PUCCH carrying HARQ-ACK collides with CSI and SR, then all can be multiplexed.

If UCI that includes HARQ-ACK information bits is transmitted, then the PUCCH resource may be identified based on the payload size of the UCI. Up to four sets of resources may be configured for the UE 310. For example, the first set has up to thirty-two PUCCH resources and is used for up to two bits of HARD-ACK and SR. Other sets have eight resources at most. Each PUCCH resource allocated by the base station 320 may include a PUCCH resource index, format, and other suitable parameters. For each format the number of symbols and the starting symbol of the allocated PUCCH resource is also provided. One PUCCH resource in a selected resource set may be indicated for the UE 310. A particular resource may be indicated in a three-bit PUCCH resource index (PRI) field of a DCI signal and provided to the UE 310, wherein the three bits may be configured to indicate one of eight different possible resources. If there are more than eight possible resources (for example, thirty-two as in the first resource set), then identification of the particular resource may also depend on a Number of Control Channel Elements (N_CCE) in a CORESET that is used to receive the DCI (for example, in the event that the first resource set is selected) and/or an index of the first CCE used for transmission of DCI (n_CCE, p).

Figure 4:
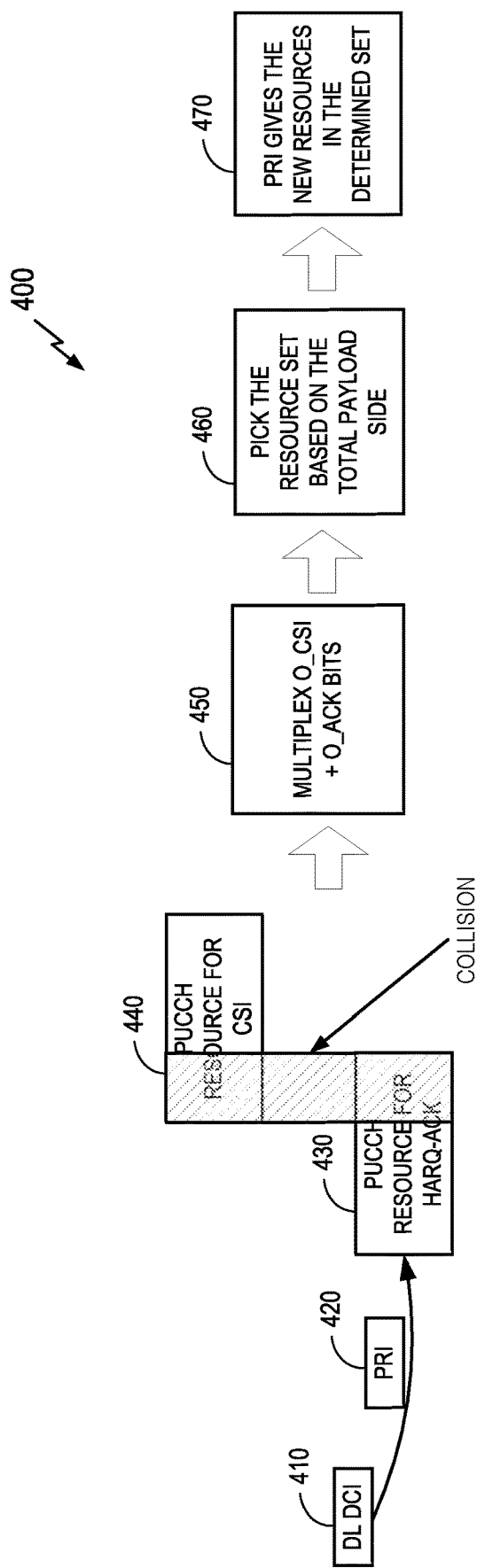
FIG. 4 generally illustrates an example chart in which a UE receives Downlink Control Information (DCI) and transmits Uplink Control Information (UCI) according to an aspect of the disclosure.

FIG. 4 generally illustrates an example chart 400 in which the UE 310 receives Downlink Control Information (DCI) 410. The DCI 410 may include a PRI 420 that may be used to schedule a PUCCH resource 430. The PUCCH resource 430 may be used to carry HARQ-ACK. The PUCCH resource 430 may collide with a PUCCH resource 440 used to carry CSI. At 450, the UE 310 may multiplex CSI and ACK bits. At 460, the UE 310 may select a resource set based on a total payload size of the UCI to be transmitted. At 470, the UE 310 determines a new resource based on PRI.

Figure 5:
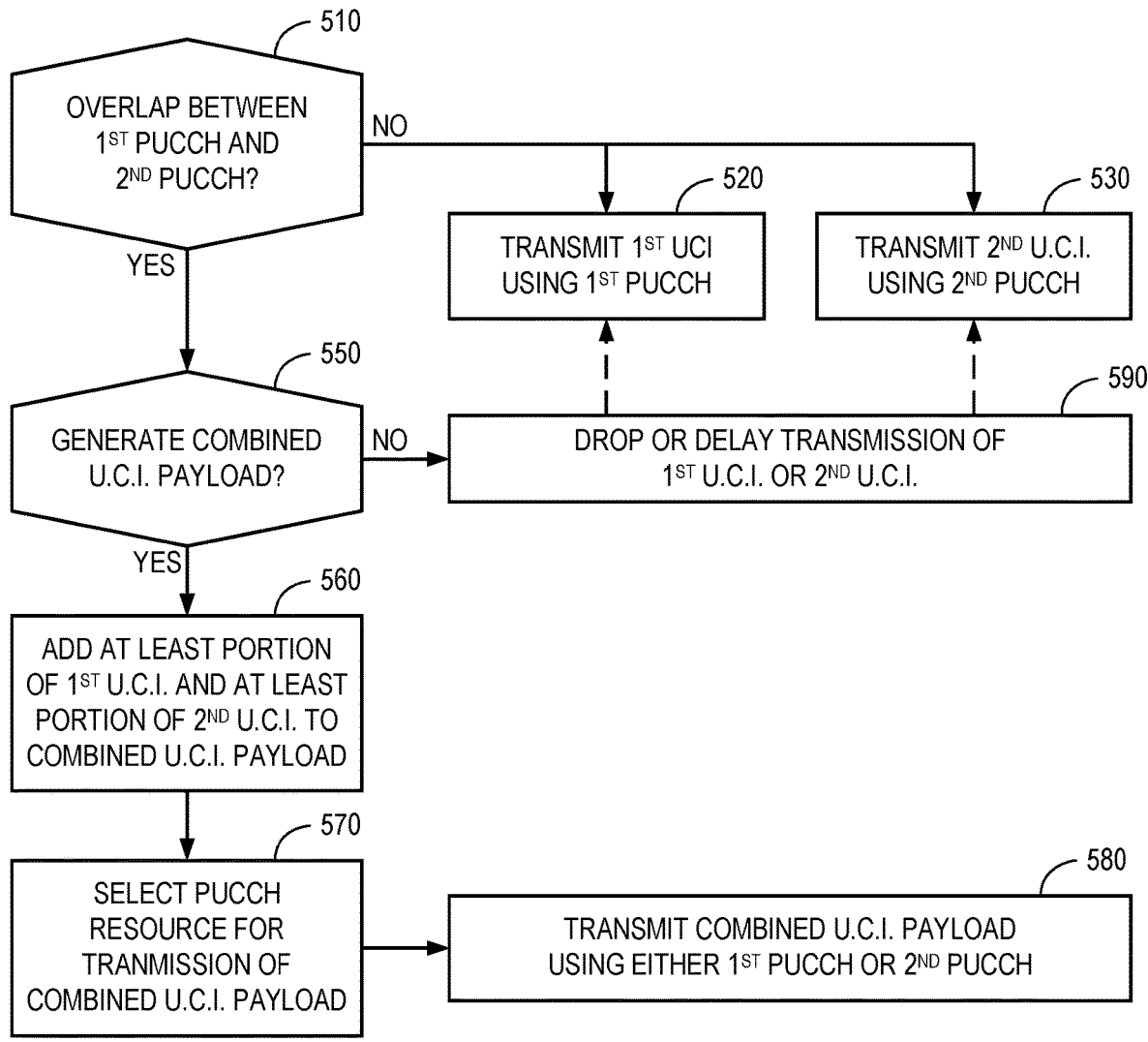
FIG. 5 generally illustrates a method for handling collisions according to an aspect of the disclosure.

FIG. 5 generally illustrates a method 500 for handling collisions. The method 500 may be performed by, for example, the UE 310 depicted in FIG. 3A.

At 510, the UE 310 determines whether there is an overlap between a first PUCCH (e.g., low-priority PUCCH, such as PUCCH for eMBB) and a second PUCCH (e.g., high-priority PUCCH, such as PUCCH for eURLLC). The determining at 510 may be performed by, for example, the processing system 312 and/or the memory system 314 depicted in FIG. 3A. Accordingly, the processing system 312 and/or the memory system 314 may constitute means for determining whether there is an overlap between a first PUCCH and a second PUCCH.

At 520, the UE 310 transmits first UCI using the first PUCCH. The transmitting at 520 may be performed by, for example, the at least one transceiver 316 depicted in FIG. 3A. Accordingly, the at least one transceiver 316 may constitute means for transmitting first UCI using the first PUCCH. In an example, the transmission at 520 may be performed responsive to the determining at 510 determining that there is no overlap between the first PUCCH and the second PUCCH.

At 530, the UE 310 transmits second UCI using the second PUCCH. The transmitting at 530 may be performed by, for example, the at least one transceiver 316 depicted in FIG. 3A. Accordingly, the at least one transceiver 316 may constitute means for transmitting second UCI using the second PUCCH. In an example, the transmission at 530 may be performed responsive to the determining at 510 determining that there is no overlap between the first PUCCH and the second PUCCH.

At 550, the UE 310 determines whether to generate a combined UCI payload. The determining at 550 may be performed by, for example, the processing system 312 and/or the memory system 314 depicted in FIG. 3A. Accordingly, the processing system 312 and/or the memory system 314 may constitute means for determining whether to generate a combined UCI payload. If the UE 310 determines at 550 to generate the combined UCI payload ('yes' at 550), the method 500 proceeds to 560. If the UE 310 determines at 550 not to generate the combined UCI payload ('no' at 550), the method 500 proceeds to 590.

At 560, the UE 310 adds at least a portion of the first UCI and at least a portion of the second UCI to the combined UCI payload. The adding at 560 may be performed by, for example, the processing system 312 and/or the memory system 314 depicted in FIG. 3A. Accordingly, the processing system 312 and/or the memory system 314 may constitute means for adding at least a portion of the first UCI and at least a portion of the second UCI to the combined UCI payload.

At 570, the UE 310 selects a PUCCH resource for transmission of the combined UCI payload. The selecting at 570 may be performed by, for example, the processing system 312 and/or the memory system 314 depicted in FIG. 3A. Accordingly, the processing system 312 and/or the memory system 314 may constitute means for selecting a PUCCH resource for transmission of the combined UCI payload.

At 580, the UE 310 transmits the combined UCI payload using either the first PUCCH resource or the second PUCCH resource. As an example, the first PUCCH resource and the second PUCCH resource may be an eMBB resource and an eURLLC resource. The transmitting at 580 may be performed by, for example, the at least one transceiver 316 depicted in FIG. 3A. Accordingly, the at least one transceiver 316 may constitute means for transmitting the combined UCI payload using either the first PUCCH or the second PUCCH. When multiplexing, the joint timeline (e.g., see Section 9.2.3 of 3GPP 38.213) across the overlapping channels should be satisfied. If the joint timeline cannot be satisfied, then (as will be discussed in greater detail below at 590) the UE 310 may not multiplex any bit, and may instead drop the eMBB channel and its UCI, and transmit eURLLC on its own channel.

An example of the joint timeline may be explained at a high level as follows. For each uplink transmission, the UE 310 requires a certain processing time. These times may be denoted as N1 and N2, wherein N1 is the gap between the end of PDSCH to the beginning of PUCCH and N2 is a gap between the end of PDCCH scheduling PUSCH to the beginning of PUSCH. When the base station 320 schedules a UE (for example, the UE 310), these gaps should be available for processing by the UE 310. If, for example, the UE 310 receives a grant and had to send the first uplink channel (for example, PUCCH) then N1 will be the focus (in units of symbols). Before the start of the PUCCH, N1 symbols should be available. In general, the decision by UE 310 to send PUCCH can be changed N1 symbols in advance. After N1 symbols, it cannot be changed. So, if the presence of the second channel overlapping with the first channel (the second channel may be, for example, eURLLC PUCCH) is known by the UE 310 N1 symbols before the start of the first uplink, the UE 310 can make joint decisions, for example, a decision to multiplex UCI. If the second channel presence is only known after the N1 symbols, then UCI cannot be multiplexed.

At 590, the UE 310 drops or delays transmission of the first UCI or the second UCI. The dropping or delaying at 590 may be performed by, for example, the processing system 312 and/or the memory system 314 depicted in FIG. 3A. Accordingly, the processing system 312 and/or the memory system 314 may constitute means for dropping or delaying transmission of the first UCI or the second UCI.

As will be understood from FIG. 5, after the dropping or delaying at 590 is complete, the method 500 may optionally return to 520 and/or 530. For example, if the UE 310 decides to drop transmission of the first UCI, then the method 500 may return to 530 only. As another example, if the UE 310 decides to delay transmission of the first UCI, then the method 500 may return to 530 and return to 520 only after the delay has been observed.

As an example, the first PUCCH may be an eMBB PUCCH and the first UCI may be eMBB UCI. Moreover, the second PUCCH may be an eURLLC PUCCH and the second UCI may be eURLLC UCI. In some implementations, the UE 310 may determine at 510 that there is an overlap between the eMBB PUCCH and the eURLLC PUCCH, generates at 560 a combined UCI payload that includes the entirety of the eURLLC UCI and at least a portion of the eMBB UCI, and transmits at 580 the combined UCI payload using the eURLLC PUCCH.

In accordance with aspects of the disclosure, in an example, uplink channels associated with enhanced Mobile Broadband (eMBB) and enhanced Ultra Reliable Low Latency Communications (eURLLC) may be differentiated from one another. In particular, a PUCCH that carries HARQ-ACK may be differentiable based on DCI format, Radio Network Temporary Identifier (RNTI), Search Space (SS), Common Resource Set (CORESET), or some other suitable parameter. When an eMBB uplink channel overlaps with an eURLLC uplink channel, the UE 310 may determine which channel to transmit and which UCI to multiplex or drop.

As an example, consider a case wherein eMBB PUCCH carrying HARQ-ACK collides with a eURLLC PUCCH carrying HARQ-ACK. Since both channels may not be transmitted simultaneously, other options must be considered. In accordance with aspects of the disclosure, three techniques are presented.

Using a drop technique, the UE 310 may drop the eMBB PUCCH carrying HARQ-ACK and transmit the eURLLC PUCCH carrying HARQ-ACK. The drop technique may reduce the downlink performance of the eMBB, but may be used when eURLLC PUCCH collides with an eMBB PUCCH (including HARQ-ACK, SR, or CSI). Alternatively, using a piggyback technique, the UE 310 may drop the eMBB PUCCH, but piggyback the a eMBB PUCCH HARQ-ACK on the eURLLC PUCCH. In a dynamic technique the UE 310 may be configured by gNB to facilitate selection by the UE 310 between the drop technique and the piggyback technique.

As noted above, the UE 310 may determine at 550 whether to generate the combined UCI payload. The determination at 550 may be made on the basis of any suitable considerations, several of which will be discussed in greater detail below.

Generally, HARQ-ACK for eURLLC require high reliability relative to eMBB. If a large number of eMBB HARQ-ACK bits are piggybacked onto an eURLLC resource, then the reliability of eURLLC may be negatively impacted. Accordingly, the UE 310 may be configured to follow certain rules ensuring that only a small number of bits are piggybacked on the eURLLC resource. The rules may involve, for example, a UCI payload size threshold, wherein the determination at 550 as to whether to generate the combined UCI payload may be based on a determination as to whether the combined UCI payload size exceeds a combined UCI payload size threshold. The combined UCI payload size threshold may be selected arbitrarily, for example, in a technical standard and/or may be selected dynamically by the base station 320 and/or the UE 310. Returning to FIG. 5, if the combined UCI payload size threshold is exceeded, then the method 550 may proceed to 590, whereas if the combined UCI payload size threshold is not exceeded, the method 550 may proceed to 560. Additionally or alternatively, the method may proceed to 590 if a suitable PUCCH resource cannot be identified, as will be discussed in greater detail below. As will be discussed in greater detail below, the UE 310 may, in accordance with aspects of the disclosure, reduce the size of the combined UCI payload until the threshold is satisfied. If eventually, it is not satisfied, then the UE 310 may drop the UCI (for example, an eMBB UCI).

In a first rule, the piggyback technique may not be supported when the collision involves Code Block Group (CBG)-based HARQ-ACK for eMBB, which typically include multiple ACK or NACKS and therefore have larger size than non-CBG-based HARQ-ACK. Accordingly, the UE 310 may avoid the piggyback technique if the collision involves the CBG-based HARQ-ACK for eMBB based on an assumption that the combined UCI payload size threshold would be exceeded.

In a second rule, the UE 310 may bundle eMBB HARQ-ACK bits when performing the piggyback technique in order to reduce the size of the combined UCI payload. In particular, the UE 310 may perform bundling in one or more of the time, space, or frequency domains. For example, the UE 310 may send one ACK for multiple receptions, rather than one ACKs for each reception, or may send one NACK for the multiple receptions if any of the multiple receptions is not received. In some implementations, only a one-bit HARQ-ACK for eMBB may be sent using the eURLLC resource. In other implementations in which frequency-domain bundling is allowed, the limit may be a one-bit-per-active-carrier limit for eMBB or one bit overall. Accordingly, the UE 310 may avoid the piggyback technique if the combined UCI payload size cannot be reduced (via bundling or any other technique) beneath the UCI payload size threshold.

In a third rule, the UE 310 may aggregate a smaller number of eMBB HARQ-ACK bits for reporting by limiting the HARQ-ACK codebook determination window size. The HARQ-ACK codebook determination window size may indicate how many slots are represented by the eMBB HARQ-ACK bits. As an example, the UE 310 may be configured such that the HARQ-ACK codebook determination window size is eight slots (e.g., the HARQ-ACK for PDSCHs in these 8 slots/sub-slots, before slot/subslot n, can potentially be sent over a PUCCH resource in slot/subslot n if indicated by the gNB); to reduce the number of bits added to the combined UCI payload, the UE 310 may reconfigure itself such that the HARQ-ACK codebook determination window size is four slots. In some implementations, the HARQ-ACK codebook determination window size may either be configured by the base station 320 or a technical standard or may be determined by the UE 310 based on the number of eURLLC bits, the number of eMBB bits, and/or the coding rate threshold set for the eURLLC resources.

Accordingly, the UE 310 may avoid the piggyback technique if the combined UCI payload size cannot be reduced (via aggregation or any other technique) beneath the UCI payload size threshold.

In a fourth rule, the piggyback technique may not be supported when the collision involves an eMBB PUCCH HARQ-ACK and an eURLLC PUCCH HARQ-ACK. Instead, the UE 310 may practice the drop technique, in which the UE 310 drops the eMBB PUCCH HARQ-ACK and transmits the eURLLC PUCCH HARQ-ACK. As a result the UE 310 may delay transmission of the eMBB PUCCH. The timing of the new PUCCH resource could be configured for the UE 310. Additionally or alternatively, the new PUCCH resource may be given implicitly as a function of the old PUCCH resource and the payload size at the transmission time of the new PUCCH resource.

In a fifth rule, the piggyback technique may increase a coding rate until a maximum coding rate threshold (configured by the base station 320) is met to enable transmission of a larger combined UCI payload. For example, if all UCI bits from both the eMBB UCI and the eURLLC UCI can be transmitted without exceeding the UCI payload size threshold, then the combined UCI payload may include the UCI bits from both the eMBB UCI and the eURLLC UCI. If the UCI payload size threshold is exceeded, a portion of the bits from either the eMBB UCI, the eURLLC UCI, or both may be transmitted at a higher coding rate, assuming that the higher coding rate does not exceed the maximum coding rate threshold. Accordingly, the UE 310 may avoid the piggyback technique if the combined UCI payload size cannot be reduced (via coding rate adjustment or any other technique) beneath the UCI payload size threshold. In some implementations, the threshold may be a function of the maximum coding rate for an eURLLC resource, a number of bits for eURLLC UCI and eMBB UCI, and/or the ratio of the number of bits for eURLLC UCI to eMBB UCI.

In a sixth rule, in an example, to multiplex low and high priority PUCCH, the gNB can configure separate PUCCH resource sets/pools only for the purpose of UCI multiplexing across channels of different priorities. When the UCI of different priorities have to be multiplexed by the UE, the UE chooses a resource from one of these sets/pools. How the resource is selected could be based on one of the 3 options on slide 8. Further, the PUCCH resources for multiplexing can be configured to be of low priority or high priority (although high priority makes more sense), and then can be associated with a low or a high priority HARQ-ACK codebook (although again the association with the high priority codebook makes more sense.)

When practicing the piggyback technique, in some designs, the UE 310 must select PUCCH resources when multiplexing is configured. See, for example, the selecting at 570 depicted in FIG. 5. As noted above, in some implementations, the PUCCH resources may be selected (or "pre-selected") during the determining at 550. In particular, one of the considerations for whether to generated the combined UCI payload may be whether there is a PUCCH resource that is suitable for selection. If there is no PUCCH resource suitable for selection, then the method 500 may proceed to 590. If the UE 310 does find a suitable PUCCH resource, then the resource selected at 570 may already have been pre-selected during the determining at 550.

Generally, the first stage of PUCCH resource selection is identification of a resource set. For example, there may be four different resource sets, and the base station 320 may select and assign one of the resource sets to a particular UE, for example, the UE 310. The first resource set may have thirty-two PUCCH resources from which to select, whereas the second, third, and fourth resource sets may have eight PUCCH resources from which to select. A particular resource may be indicated in a three-bit PUCCH resource index (PRI) field of a DCI signal and provided to the UE 310, wherein the three bits may be configured to indicate one of eight different possible resources. If there are more than eight possible resources (for example, thirty-two as in the first resource set), then identification of the particular resource may also depend on a Number of Control Channel Elements (N_CCE) in a CORESET that is used to receive the DCI (for example, in the event that the first resource set is selected) and/or an index of the first CCE used for transmission of DCI (n_CCE,p). Once the DCI signal is received, the UE 310 may identify the assigned resource and then select a particular resource set for transmission of UCI. The selecting of the particular resource set by the UE 310 may be based on a payload size of the UCI.

In some implementations, the base station 320 may assign to the UE 310 a first resource set for eMBB and a second resource set for eURLLC. There may be overlap between the selected resource sets, which may lead to a collision between respective UCI transmissions. However, there are two pools (i.e., resource sets) of PUCCH resources to select from in the event that the 310 determines to generate and/or transmit a combined UCI payload. In accordance with aspects of the disclosure, there are three options for selecting the particular resource used to transmit the combined UCI payload.

In a first option for selecting the PUCCH resource, the UE 310 may determine (1) the size of the combined UCI payload (which may be larger than the eURLLC UCI alone), and (2) the PRI (and if necessary N_CCE and n_CCE,p) provided in the most recent eURLLC DCI transmission.

In a second option for selecting the PUCCH resource, the UE 310 may determine (1) the size of the combined UCI payload (which may be larger than the eURLLC UCI alone), and (2) the PRI (and if necessary N_CCE and n_CCE,p) provided in the most recent eMBB DCI transmission.

In a third option for selecting the PUCCH resource, the UE 310 may determine (1) the size of the combined UCI payload (which may be larger than the eURLLC UCI alone), and (2) the PRI (and if necessary N_CCE and n_CCE,p) provided in the most recent DCI transmission, regardless of whether the most recent DCI transmission was received using eMBB or eURLLC.

In some implementations, there may be multiple eURLLC HARQ-ACK transmissions per slot with multiple eURLLC PUCCHs carrying the HARQ-ACK. The multiple eURLLC PUCCHs may collide with an eMBB PUCCH carrying HARQ-ACK (which may include one eMBB PUCCH per slot). If multiplexing is allowed, the UE 310 may have to determine which of the multiple eURLLC PUCCH in the slot should carry the eMBB HARQ-ACK. In accordance with aspects of the disclosure, the UE 310 may determine whether a particular eURLLC PUCCH (from the set of multiple eURLLC PUCCH) can be used to transmit the combined UCI payload without violating joint timeline constraints. Joint timeline constraints must be considered in cases where multiple PUCCH are configured for the same UE (i.e., eMBB PUCCH, eURLLC PUCCH, etc.). If the UE 310 can identify a particular eURLLC PUCCH (from the set of multiple eURLLC PUCCH) that can be used to transmit the combined UCI payload without violating the joint timeline constraints, then that particular eURLLC PUCCH may be selected in accordance with aspects of the disclosure.

If an eMBB PUCCH carrying HARQ-ACK collides with multiple eURLLC PUCCHs carrying HARQ-ACK, two options are proposed for selecting a resource (as in 570 depicted in FIG. 5) in accordance with aspects of the disclosure.

In the first option, the UE 310 may multiplex eMBB HARQ-ACK with the first eURLLC PUCCH that satisfies the joint timeline constraints (i.e., concerning the joint timeline between that eURLLC PUCCH resource and the eMBB PUCCH resource).

In the second option, the UE 310 may multiplex eMBB HARQ-ACK with all the eURLLC PUCCHs that satisfy the joint timeline.

If no suitable PUCCH can be identified (a determination which may be one of the considerations associated with the determining at 550), then this may lead to a decision to drop or delay transmission (at 590) of either the eMBB UCI or the eURLLC UCI.

In accordance with aspects of the disclosure, chain effects are considered. When multiplexing the eMBB and eURLLC HARQ-ACKs, the selected PUCCH resource may collide with other eURLLC PUCCH resources. Hence, mode multiplexing operations are required. To prevent chain effects, the following approach is proposed in accordance with aspects of the disclosure.

When multiplexing eMBB and eURLLC HARQ-ACK, the UE 310 may select the PUCCH resource set based on the total payload and may further identify one resource within the resource set that does not collide with other eURLLC PUCCHs. If these resources are not sufficient to carry the eMBB bits (the total number of bits or the reduced number of bits as mentioned before), the eMBB bits should be dropped. As described in Qualcomm Ref. No. 184787P1 (hereinafter "Incorporated Reference"), filed Aug. 21, 2018, which is fully incorporated by reference into the present disclosure, resource selection may also include selection of particular "virtual mini-slots" to facilitate avoidance of chain effects. In particular, the UE 310 may be configured to operate within a system that specifies a partitioning of the slot into multiple virtual mini-slots. Moreover, in accordance with aspects of the present disclosure, the UE 310 may pursue a resource selection strategy that utilizes the approach described in the Incorporated Reference. In particular, the resource selected by the UE 310 to transmit the combined UCI payload of the present disclosure may correspond to the virtual mini-slot over which to transmit feedback in the Incorporated Reference. As a result, the technique for selection of the resource in the present disclosure may limit chain effects by practicing the techniques described in the Incorporated Reference. Moreover, in the event that the UE 310 cannot identify a resource that can be used to transmit the combined UCI payload in a way that complies with the techniques described in the Incorporated Reference, the UE 310 may determine to not generate the combined UCI payload (i.e., 'no' at 550 in FIG. 5).

When, for example, an eURLLC PUCCH in a mini-slot n collides with an eMBB PUCCH, the UE 310 may choose one of the PUCCH resources associated with mini-slot n that is fully contained in mini-slot n. Alternatively, if it is not contained, there is no PUCCH resource associated with mini-slot n+1, etc., that would overlap with it. If such a resource does not exist, then the eMBB UCI, for example, should either be dropped or sufficiently reduced in size prior to transmitting.

There could be many examples of such PUCCH resources. The PRI, for example, may indicate a particular resource. Alternatively, the UE 310 may remove all the resources that do not satisfy the abovementioned condition, and then the PRI points to one of the remaining resources. Under these two options, which PRI bit sequence points to which resource is different.

As another alternative, the base station 320 may configure eURLLC PUCCH resources that are not contained in each sub-slot. Given that eURLLC PDSCHs have the requirement, if one of such resources is used for eURLLC, and spans over the sub-slot boundary, the base station 320 may make sure not to indicate a PUCCH resource that collides with it in the next sub-slot. As a result, the UE 310 is not expected to have overlapping eURLLC PUCCH resources. However, since eMBB and eURLLC have different time-lines, it is not always possible to plan ahead of time (for example, eMBB may be scheduled and eURLLC may be scheduled later). As a result, the respective PUCCHs may overlap. As a result, the UE has to multiplex the bits, and the resulting PUCCH could be a long PUCCH format. A long PUCCH format may span multiple sub-slots and delay the scheduling of the next eURLLC PDSCHs.

In case eURLLC and eMBB PUCCHs carrying HARQ-ACK collide, the UE 310 may exclude all the resources in the resource set of a given sub-slot that are not self-contained. Then, the indication in the DCI maps to one of the remaining resources. If such a resource does not exist, then the UE 310 may determine to drop eMBB HARQ-ACK (for example, at 550 and/or 590).

Various embodiments of the disclosure are described above with respect to selectively combining payloads associated with overlapping transmissions, whereby a first transmission corresponds to a PUCCH for eMBB and a transmission corresponds to a PUCCH for eURLLC. It will be appreciated that such examples are broadly representative of communication schemes associated with a higher-priority communication (e.g., PUCCH for eURLLC, high-priority PUSCH, etc.) overlapping with a lower-priority communication (e.g., PUCCH for eMBB, low-priority PUSCH, etc.). Such aspects are more broadly described below with respect to FIGS. 6-7. Accordingly, in some designs, various aspects of the present disclosure may directed to multiplexing across channels (e.g., PUCCHs, PUSCHs, etc.) and/or transmissions (e.g., UCIs) associated with different priorities.

Figure 6:
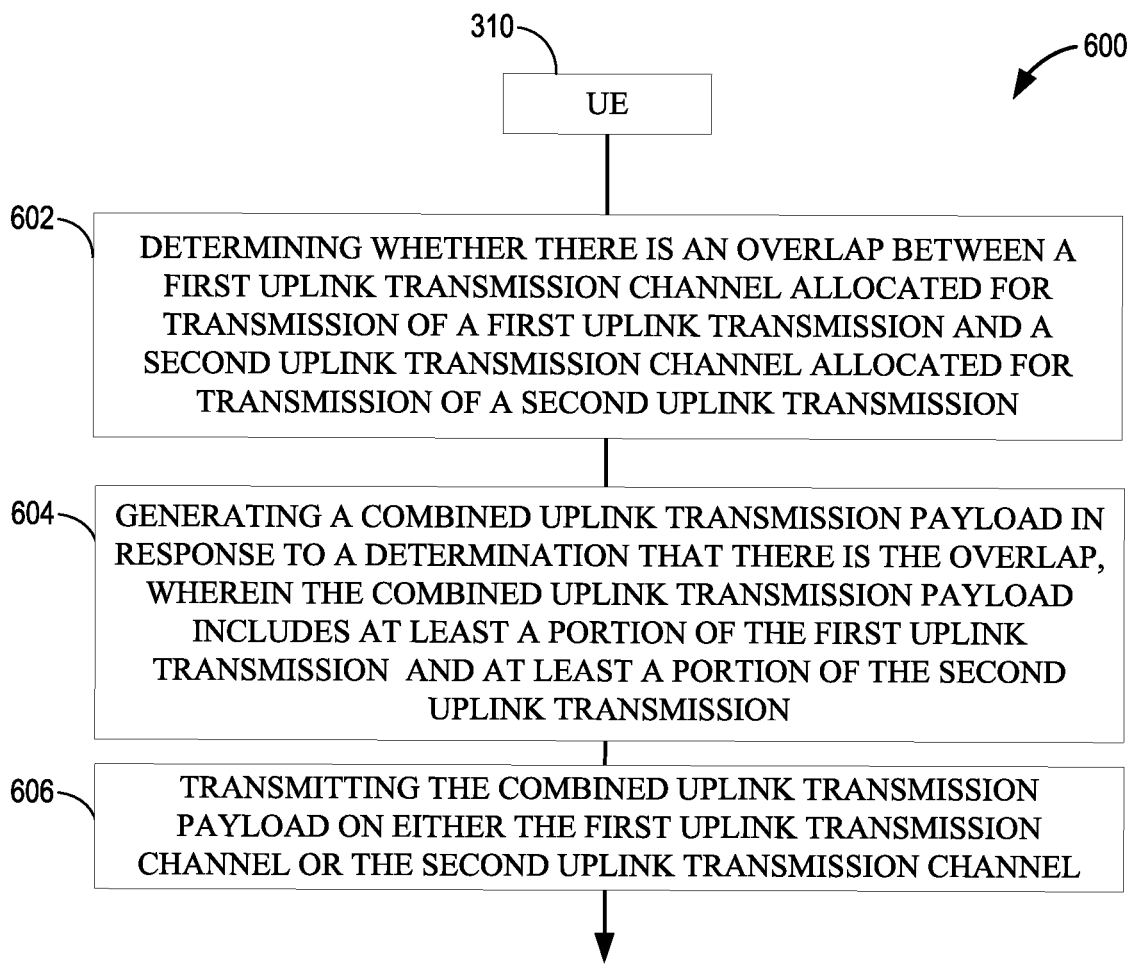
FIG. 6 illustrates an exemplary process of wireless communications according to an aspect of the disclosure.

FIG. 6 illustrates an exemplary process 600 of wireless communications according to an aspect of the disclosure. The process 600 of FIG. 6 is performed by UE 310. Some aspects of FIGS. 4-5 correspond to example implementations of the process of FIG. 6.

At 602, UE 310 determines whether there is an overlap between a first uplink transmission channel (e.g., PUSCH, PUCCH, etc.) allocated for transmission of a first uplink transmission (e.g., a UCI, such as PUCCH for eMBB, etc.) and a second uplink transmission channel (e.g., PUSCH, PUCCH, etc.) allocated for transmission of a second uplink transmission (e.g., a UCI, such as PUCCH for eURLLC, etc.). At 604, UE 310 generates a combined uplink transmission payload in response to a determination that there is the overlap, wherein the combined uplink transmission payload includes at least a portion of the first uplink transmission and at least a portion of the second uplink transmission. At 606, UE 310 transmits the combined uplink transmission payload on either the first uplink transmission channel or the second uplink transmission channel.

Referring to FIG. 6, in an example, the first uplink transmission (e.g., UCI) may be associated with a lower priority than the second uplink transmission (e.g., UCI). In a specific example, the first uplink transmission channel is a PUCCH for eMBB and the second uplink transmission channel is a PUCCH for eURLLC, the combined uplink transmission (e.g., UCI) payload includes the entirety of the second uplink transmission (e.g., UCI) and a portion (e.g., less than all) of the first uplink transmission (e.g., UCI) (e.g., due to the relative UCI priority levels), and the transmitting of 606 comprises transmitting the combined uplink transmission (e.g., UCI) payload on the PUCCH for eURLLC.

Referring to FIG. 6, either before 602 or after 606, UE 310 may determine whether there is an overlap between the first uplink transmission channel allocated for transmission of third uplink transmission (e.g., UCI) and the second uplink transmission channel allocated for transmission of fourth uplink transmission (e.g., UCI). In response to a determination that there is no overlap between the third uplink transmission (e.g., UCI) and the fourth uplink transmission (e.g., UCI), UE 310 may transmit the third uplink transmission (e.g., UCI) on the first uplink transmission channel, and may transmit the fourth uplink transmission (e.g., UCI) on the second uplink transmission channel. Hence, in some designs, the uplink transmission (e.g., UCI) overlap condition may control whether combined or independent uplink transmissions (e.g., UCIs) are made.

Referring to FIG. 6, UE 310 may further select a resource from the second uplink transmission channel for transmission of the combined uplink transmission (e.g., UCI) payload. In some designs, this selection may comprise selecting the resource based on a payload size of the combined uplink transmission (e.g., UCI) payload and a PUCCH resource indicator provided in a most-recently received eURLLC Downlink Control Information (DCI) signal, selecting the resource based on a payload size of the combined uplink transmission (e.g., UCI) payload and a PUCCH resource indicator provided in a most-recently received eMBB DCI signal, selecting the resource based on a payload size of the combined uplink transmission (e.g., UCI) payload and a PUCCH resource indicator provided in a most-recently received DCI signal, or any combination thereof.

Referring to FIG. 6, UE 310 may further determine whether to generate the combined uplink transmission (e.g., UCI) payload at 602 based on at least one other condition (e.g., other than UCI overlap condition), wherein the generating at 604 is further in response to a determination to generate the combined uplink transmission (e.g., UCI) payload based on the at least one other condition. In an example, determining whether to generate the combined uplink transmission (e.g., UCI) payload based on at least one other condition comprises determining whether the first uplink transmission (e.g., UCI) is a one-bit HARQ-ACK (e.g., for eMBB_ or a one-bit-per-carrier HARQ-ACK (e.g., for eMBB), and determining to generate the combined uplink transmission (e.g., UCI) payload in response to a determination that the first uplink transmission (e.g., UCI) is a one-bit HARQ-ACK for eMBB or a one-bit-per-carrier HARQ-ACK (e.g., for eMBB). In another example, determining whether to generate the combined uplink transmission (e.g., UCI) payload based on at least one other condition comprises determining whether HARQ-ACK codebook determination window size exceeds a window size threshold, reducing the HARQ-ACK codebook determination window size based on a determination that the HARQ-ACK codebook determination window size exceeds the window size threshold, and determining to generate the combined uplink transmission (e.g., UCI) payload in response to a determination that the HARQ-ACK codebook determination window size is reduced such that it does not exceed the window size threshold. In another example, determining whether to generate the combined uplink transmission (e.g., UCI) payload based on at least one other condition comprises determining whether the first uplink transmission (e.g., UCI) is a HARQ-ACK (e.g., for eMBB), determining whether the second uplink transmission (e.g., UCI) is a HARQ-ACK for eURLLC, and determining to not generate the combined uplink transmission (e.g., UCI) payload in response to determinations that the first uplink transmission (e.g., UCI) is the HARQ-ACK for eMBB and that the second uplink transmission (e.g., UCI) is the HARQ-ACK for eURLLC.

Referring to FIG. 6, UE 310 may further determine whether there is an overlap between the first uplink transmission channel allocated for transmission of third uplink transmission (e.g., UCI, e.g., for eMBB) and the second uplink transmission channel allocated for transmission of fourth uplink transmission (e.g., UCI, e.g., eURLLC). In response to a determination that there is an overlap between the third uplink transmission (e.g., UCI) and the fourth uplink transmission (e.g., UCI), UE 310 may transmit the fourth uplink transmission (e.g., UCI) on the second uplink transmission channel without transmitting any portion of the third uplink transmission (e.g., UCI) on the second uplink transmission channel. UE 310 may further determine whether to drop or delay transmission of the third uplink transmission (e.g., UCI) in response to a determination to not generate the combined uplink transmission (e.g., UCI) payload based on one or more other considerations. UE 310 may further determine a transmission timing of the first uplink transmission (e.g., UCI) in response to a determination to delay transmission of the third uplink transmission (e.g., UCI), and may transmit the third uplink transmission (e.g., UCI) in accordance with the transmission timing.

Figure 7:
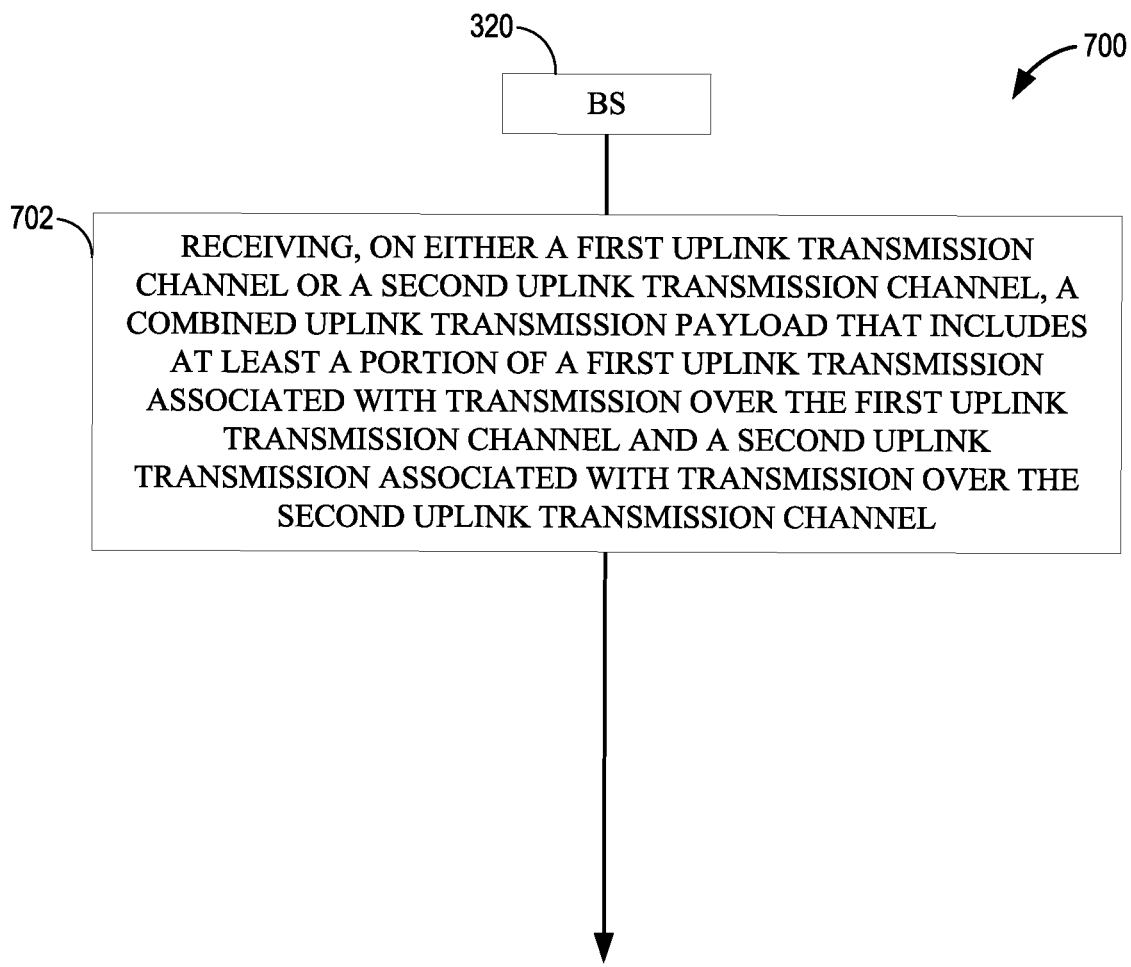
FIG. 7 illustrates an exemplary process of wireless communications according to an aspect of the disclosure.

FIG. 7 illustrates an exemplary process 700 of wireless communications according to an aspect of the disclosure. The process 700 of FIG. 7 is performed by BS 320. Some aspects of FIGS. 4-5 correspond to example implementations of the process of FIG. 7.

At 702, BS 320 receives, on either a first uplink transmission channel (e.g., PUSCH, PUCCH, etc.) or a second uplink transmission channel (e.g., PUSCH, PUCCH, etc.), a combined uplink transmission payload that includes at least a portion of a first uplink transmission (e.g., a UCI, such as PUCCH for eMBB, etc.) associated with transmission over the first uplink transmission channel and a second uplink transmission (e.g., a UCI, such as PUCCH for eURLLC, etc.) associated with transmission over the second uplink transmission channel. In an example, the combined uplink transmission (e.g., UCI) payload received at 702 may correspond to the combined uplink transmission (e.g., UCI) payload transmitted by UE 310 at 606 of FIG. 6.

Referring to FIG. 7, in an example, the combined uplink transmission (e.g., UCI) payload may comprise the entirety of the second uplink transmission (e.g., UCI) and a portion of the second uplink transmission (e.g., UCI). In a further example, the portion of the second uplink transmission (e.g., UCI) may be less than all of the second uplink transmission (e.g., UCI). In some aspects, this is due to the first uplink transmission (e.g., UCI, e.g., for eMBB) being associated with a lower priority than the second uplink transmission (e.g., UCI, e.g., for eURLLC). In a further aspect, the first uplink transmission channel may be a PUCCH for eMBB and the second uplink transmission channel may be a PUCCH for eURLLC. In some designs, the combined uplink transmission (e.g., UCI) payload may be received as part of the PUCCH for eURLLC (e.g., with the eMBB UCI part being piggybacked on the eURLLC part).

As discussed herein, an integrated circuit may include an application-specific integrated circuit (ASIC), a processor, software, other related components, or any combination thereof. Thus, the functions performed by these components as described herein may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module. One skilled in the art will recognize in this disclosure an algorithm represented in the prose described above, as well in sequences of actions that may be represented by pseudocode.

In addition, the components and functions described herein may be implemented using any suitable means. Such means also may be implemented, at least in part, using corresponding structure as taught herein. For example, the components described above may correspond to similarly designated "code for" functionality. Thus, in some aspects one or more of such means may be implemented using one or more of processor components, integrated circuits, or other suitable structure as taught herein.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted (unless specified otherwise) as "based at least in part on" rather than, for example, "based solely on". It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc.

It should be further understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a user equipment (UE), comprising:
   determining that there is an overlap between the first PUCCH and the second PUCCH;
   in response to the determination:
   generating a combined uplink control information (UCI) payload, wherein the combined UCI payload includes a first part of a first UCI associated with a first physical uplink control channel (PUCCH) and a second UCI associated with a second PUCCH;
   transmitting the combined UCI payload on a PUCCH resource; and
   dropping or delaying transmission of a second part of the first UCI.

2. The method of claim 1, wherein the first PUCCH is associated with a lower priority than the second PUCCH.

3. The method of claim 2,
   wherein the first PUCCH is for Enhanced Mobile Broadband (eMBB) and the second PUCCH is for Enhanced Ultra Reliable Low Latency Communication (eURLLC), and
   wherein the PUCCH resource over which the combined UCI payload is transmitted corresponds to the second PUCCH.

4. The method of claim 1, wherein the combined UCI payload includes an entirety of the second UCI.

5. The method of claim 1, further comprising:
   determining whether to generate the combined UCI payload based on at least one condition other than whether there is an overlap between the first PUCCH and the second PUCCH.

6. The method of claim 5, wherein the at least one other condition comprises whether the first UCI comprises a Code Block Group (CBG)-based HARQ-ACK.

7. The method of claim 1, wherein the PUCCH resource over which the combined UCI payload is transmitted comprises the first PUCCH.

8. The method of claim 7, wherein the PUCCH resource over which the combined UCI payload is transmitted comprises is the second PUCCH.

9. A method of operating a wireless network component, comprising:
   receiving, on a physical uplink control channel (PUCCH) resource, a combined uplink control information (UCI) payload,
   wherein the combined UCI payload includes a first part of a first UCI associated with a first PUCCH and a second UCI associated with a second PUCCH, and
   wherein reception of a second part of the first UCI is dropped or delayed based on an overlap between the first PUCCH and the second PUCCH.

10. The method of claim 9, wherein the first UCI is associated with a lower priority than the second UCI.

11. The method of claim 10,
    wherein the first PUCCH is for Enhanced Mobile Broadband (eMBB) and the second PUCCH is for Enhanced Ultra Reliable Low Latency Communication (eURLLC), and
    wherein the PUCCH resource over which the combined UCI payload is received corresponds to the second PUCCH.

12. The method of claim 9, wherein the combined UCI payload comprises an entirety of the second UCI.

13. The method of claim 9, wherein the PUCCH resource over which the combined UCI payload is received comprises the first PUCCH.

14. The method of claim 9, wherein the PUCCH resource over which the combined UCI payload is received comprises the second PUCCH.

15. A user equipment (UE), comprising:
    a memory;
    at least one transceiver; and
    at least one processor communicatively coupled to the memory and the at least one transceiver, the at least one processor configured to:
    determine that there is an overlap between the first PUCCH and the second PUCCH;

in response to the determination:
generate a combined uplink control information (UCI) payload,
wherein the combined UCI payload includes less than all of a first UCI associated with a first physical uplink control channel (PUCCH) and a second UCI associated with a second PUCCH; and
transmit, via the at least one transceiver, the combined UCI payload on a PUCCH resource; and
drop or delay transmission of a second part of the first UCI.

16. The UE of claim 15, wherein the first PUCCH is associated with a lower priority than the second PUCCH.

17. The UE of claim 16,
wherein the first PUCCH is for Enhanced Mobile Broadband (eMBB) and the second PUCCH is for Enhanced Ultra Reliable Low Latency Communication (eU-RLLC), and
wherein the PUCCH resource over which the combined UCI payload is transmitted corresponds to the second PUCCH.

18. The UE of claim 15, wherein the combined UCI payload includes an entirety of the second UCI.

19. The UE of claim 15, wherein the at least one processor is further configured to:
determine whether to generate the combined UCI payload based on at least one condition other than whether there is an overlap between the first PUCCH and the second PUCCH.

20. The UE of claim 19, wherein the at least one other condition comprises whether the first UCI comprises a Code Block Group (CBG)-based HARQ-ACK.

21. The UE of claim 15, wherein the PUCCH resource over which the combined UCI payload is transmitted comprises the first PUCCH.

22. The UE of claim 21, wherein the PUCCH resource over which the combined UCI payload is transmitted comprises the second PUCCH.

23. A wireless network component, comprising:
a memory;
at least one transceiver; and
at least one processor communicatively coupled to the memory and the at least one transceiver, the at least one processor configured to:
receive, via the at least one transceiver, on a physical uplink control channel (PUCCH) resource, a combined uplink control information (UCI) payload,
wherein the combined UCI payload includes a first part of a first UCI associated with a first PUCCH and a second UCI associated with a second PUCCH, and
wherein reception of a second part of the first UCI is dropped or delayed based on an overlap between the first PUCCH and the second PUCCH.

24. The wireless network component of claim 23, wherein the first UCI is associated with a lower priority than the second UCI.

25. The wireless network component of claim 24,
wherein the first PUCCH is for Enhanced Mobile Broadband (eMBB) and the second PUCCH is for Enhanced Ultra Reliable Low Latency Communication (eU-RLLC), and
wherein the PUCCH resource over which the combined UCI payload is received corresponds to the second PUCCH.

26. The wireless network component of claim 23, wherein the combined UCI payload comprises an entirety of the second UCI.

27. The wireless network component of claim 23, wherein the PUCCH resource over which the combined UCI payload is received comprises the first PUCCH.

28. The wireless network component of claim 23, wherein the PUCCH resource over which the combined UCI payload is received the second PUCCH.

* * * * *